United States Patent [19]

Miller

[11] 4,102,560
[45] Jul. 25, 1978

[54] OPTICAL COUPLER

[75] Inventor: Arthur Miller, Princeton Junction, N.J.

[73] Assignee: RCA Corporation, New York, N.Y.

[21] Appl. No.: 751,171

[22] Filed: Dec. 16, 1976

Related U.S. Application Data

[63] Continuation-in-part of Ser. No. 675,260, Apr. 8, 1976, abandoned.

[51] Int. Cl.² .............................................. G02B 5/14
[52] U.S. Cl. ................................ 350/96.19; 350/162 R
[58] Field of Search ............ 350/96 C, 96 WG, 162 R

[56] References Cited

U.S. PATENT DOCUMENTS

| | | | |
|---|---|---|---|
| 3,674,336 | 7/1972 | Kogelnik | 350/96 C |
| 3,912,363 | 10/1975 | Hammer | 350/96 C |
| 3,982,810 | 9/1976 | Tamir et al. | 350/96 C |
| 4,018,506 | 4/1977 | Hammer | 350/96 C |

OTHER PUBLICATIONS

IBM Tech. Disc. Bulletin, vol. 13, No. 9, Feb. 71, pp. 2529–2530, article by Ash et al.

*Primary Examiner*—John K. Corbin
*Assistant Examiner*—Stewart Levy
*Attorney, Agent, or Firm*—H. Christoffersen; Joseph D. Lazar; Leonard Weiss

[57] ABSTRACT

A pair of diffraction gratings are disposed between a fiber and a waveguide carried by a substrate. The gratings each have a common spatial frequency component that couples light between the fiber and the waveguide. Light from the gratings establish first and second components of an electromagnetic field that extend into the substrate. The gratings are constructed and positioned to cause the first and second components to be of substantially equal amplitude and opposite phase thereby inhibiting a coupling of light into the substrate.

3 Claims, 1 Drawing Figure

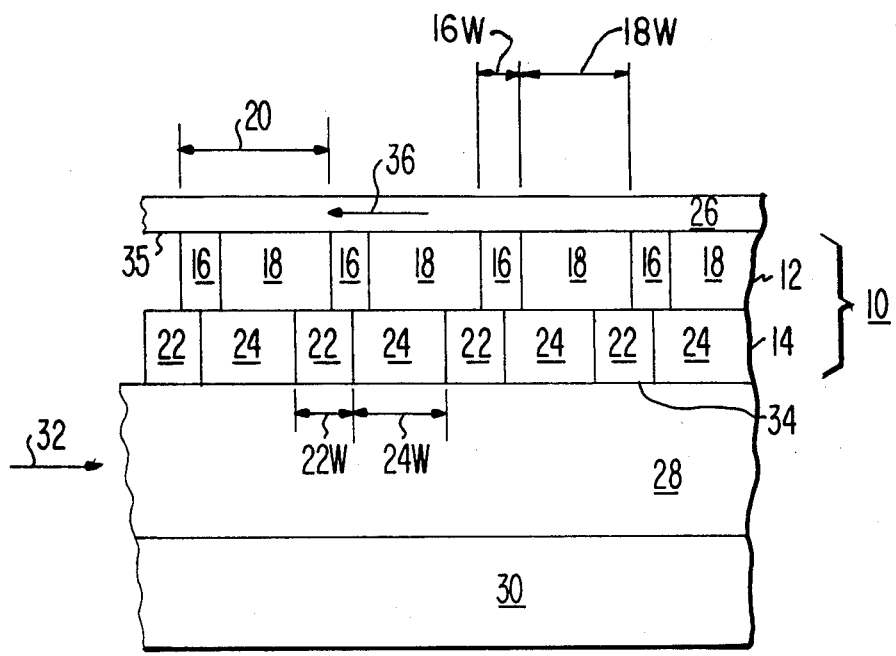

OPTICAL COUPLER

The Government has rights in this invention pursuant to Contract No. N00014-75-C-0436 awarded by the Department of the Navy.

This is a continuation-in-part of the patent application having Ser. No. 675,260, filed on Apr. 8, 1976, now abandoned, assigned to the same assignee as that of the present application.

BACKGROUND OF THE INVENTION

1. Field of Invention

This invention relates to optics and more particularly to coupling electromagnetic energy between a guiding layer and a medium.

2. Description of the Prior Art

In an electrical communication system, a message comprises an electrical signal transmitted through a copper wire which spans a distance between two terminals. The wire is an undesirable feature of the electrical system because copper is expensive, heavy and (because of extensive usage) will ultimately be in short supply. Since the wire is undesirable, an attractive alternative to the electrical system is an optical communication system where a light-conducting fiber spans the distance between the terminals and a message comprises a modulated light beam transmitted therethrough.

In addition to the fiber, the optical system may include either a channel or a planar waveguide, comprised of what is known as an electro-optic material. The electro-optic material has a high refractive index that changes in response to a change of a voltage applied thereto. Being formed of the electro-optic material, the waveguide may be used as a signal processing element, such as a modulator, a demodulator, or a switch.

An essential feature of such an optical system is a coupling of light into the fiber from the waveguide, and vice versa. The light may be coupled by a type of optical coupler predicated upon evanescent waves emanating from a conductor of electromagnetic energy.

The existence of evanescent waves is the matter of a well known experiment where a beam of light is transmitted along a line of entry to a transparent first prism. The first prism has two faces at right angles to each other, and a hypotenuse face which forms a forty-five degree angle with each of the right-angle faces.

The line of entry is perpendicular to one of the right angle faces whereby the hypotenuse face has the beam transmitted thereto with an angle of incidence of forty-five degrees. The first prism has a refractive index that causes a total reflection of the beam within the first prism from the hypotenuse face thereby causing the beam to exit from the first prism perpendicularly through the other right angle face.

A second prism, similar to the first prism, has a hypotenuse face which is placed against the hypotenuse face of the first prism, whereby the prisms form a transparent rectangular solid. The beam is transmitted through the rectangular solid along the line of entry. However, when the hypotenuse faces are separated by a small distance, typically less than or equal to a wavelength of the beam, one portion of the beam is reflected from the hypotenuse face of the first prism, as described hereinbefore, while another portion of the beam is transmitted through the prisms along the line of entry.

This experiment demonstrates that the reflection of the beam from the hypotenuse face of the first prism causes an existence external thereto of waves of electromagnetic energy. The waves of electromagnetic are the evanescent waves referred to hereinbefore. In the optical coupler, the coupling into the fiber from the waveguide (and vice versa) is via evanescent waves.

The first prism is referred to as a distributed optical coupler because coupling is provided over a length that is many times the wavelength of the coupled electromagnetic energy (i.e., the length of the hypotenuse face of the first prism). A distributed coupler causes electromagnetic energy transmitted thereto from an input device, such as a fiber, to have electric and magnetic moments which vary in space and in time synchronously with the phase of a wave of electromagnetic energy which could propagate in a coupled output device, such as a waveguide. The synchronous propagation of electromagnetic energy is referred to as phase matching.

Phase matching may be achieved when a distributed coupler is a periodic diffraction grating disposed in a coupling region where the grating couples the waveguide to the fiber via evanescent waves. It should be understood that the grating, unlike the prisms, is substantially planar. Additionally, the waveguide and the fiber are substantially planar. Therefore, the grating, the waveguide, and a coupled portion of the fiber may be integrated into a planar assembly that is mechanically stable and durable.

Usually, the waveguide has a thickness on the order of one micron. Because of the one micron thickness, the waveguide is mounted on a supporting structure known as a substrate. Typically, the distributed grating coupler has associated with it a problem of inefficiency because the grating couples a portion of the electromagnetic energy (light) into the substrate.

SUMMARY OF THE INVENTION

According to the present invention, a plurality of diffraction gratings are disposed proximate to a guiding layer, carried by a substrate, and to a medium, for coupling electromagnetic energy between the guiding layer and the medium while inhibiting coupling of electromagnetic energy into the substrate.

BRIEF DESCRIPTION OF THE DRAWING

The sole FIGURE herein is a side elevation of a segment of a waveguide coupled to a segment of a fiber in accordance with the preferred embodiment of the present invention.

DESCRIPTION OF THE PREFERRED EMBODIMENT

As shown in the drawing, an optical coupler 10 includes a phase diffraction grating 12 that has a surface contiguously connected to a phase diffraction grating 14. Gratings 12 and 14 may be made from gelatin, photoresist, lithium niobate, or any other suitable material, as well known in the art.

Grating 12 is formed of alternatively disposed transparent bars 16 and 18 that have respective first and second indexes of refraction and respective widths 16W and 18W. A distance 20, between corresponding consecutive portions of grating 12, is known in the art as the period of grating 12. In this embodiment, distance 20 is 1738 angstrom units.

Grating 14 is formed of alternatively disposed transparent bars 22 and 24 that respectively have the first and second indexes of refraction (as that of bars 16 and 18) and respective widths 22W and 24W. Additionally, the period of grating 14, like the period of grating 12, is equal to distance 20, whereby gratings 12 and 14 have a common fundamental spatial frequency component. Although the period of grating 12 and the period of grating 14 each equal distance 20, it should be understood that widths 16W and 18W may differ, respectively, from widths 22W and 24W.

Coupler 10 is disposed between a fiber 26 and a waveguide 28 carried by a substrate 30. It should be appreciated that coupler 10 may be disposed proximate to fiber 26 and waveguide 28 in any other suitable manner.

Waveguide 28 and substrate 30 are preferably made from lithium niobate and lithium tantalate, respectively. However, waveguide 28 and substrate 30 may be made from any other suitable material. Additionally, it should be understood that coupler 10 may be disposed between any suitable light conducting medium and waveguide 28 for coupling light therebetween. Information on the construction and characteristics of gratings on a substrate is given by the following articles: "Ion Beam Micromachining of Integrated Optics Components" in Applied Optics, Volume 12, Number 3, March, 1973, by Hugh L. Garvin, E. Garmire, S. Somekh, H. Stoll and A. Yarv; and "Grating Coupler for Efficient Excitation of Optical Guided Waves in Thin Films" in Applied Physics Letters, Volume 16, Number 12, June 15, 1970, by M. L. Dakss, L. Kuhn, P. F. Heidrich, and B. A. Scott.

When an input beam of light is transmitted in a direction indicated by an arrow 32 through waveguide 28, a first evanescent electromagnetic field therefrom emanates through the interface 34 between coupler 10 and waveguide 28. The light of the first evanescent field is diffracted by gratings 12 and 14.

The diffracted light produces a second evanescent electromagnetic field that extends through the interface 35 between coupler 10 and fiber 26. A useful portion of the diffracted light is coupled, via the second evanescent field, into fiber 26 to provide an output beam of light that is transmitted in the direction of an arrow 36. Additionally, first and second components of a substrate electromagnetic field are established in response to the diffracted light from gratings 12 and 14, respectively. The first and second field components extend into substrate 30. It should be understood that when there is an electromagnetic field within substrate 30, light (electromagnetic energy) is coupled thereto by coupler 10, thereby causing coupler 10 to be inefficient.

It should be appreciated that when width 16W is very small compared to the width 18W, grating 12 is substantially a uniform transparent slab with the second index of refraction. Since a uniform transparent slab does not diffract light, when width 18W is very small, the first field component has an amplitude substantially equal to zero. Terms, such as diffraction strength, are used to refer to a percentage of input light diffracted by a diffraction grating.

Similarly, when the width 22W is very small compared to width 24W, grating 14 is substantially a uniform slab with the second index of refraction whereby the second field component has an amplitude substantially equal to zero. Accordingly, widths 16W and 22W may be chosen to decrease the amplitudes of the first and second field components, respectively, to desired amplitudes. An essential feature of the invention is that the widths 16W and 22W are chosen to cause the amplitudes of the first and second field components to be equal and non-zero.

As known to those skilled in the art, during a translation of grating 12 in the direction of arrow 32, the phase of the first field component continually changes. Moreover, when the translation is through a distance equal to distance 20, the phase of the first field component changes by 360°. An essential feature of the present invention is that grating 12 is at a position relative to grating 14 where the first and second field components are of opposite phase. In accordance with the essential features of the present invention, the first and second field components have equal amplitudes and opposite phase. Accordingly, the substrate field is suppressed thereby inhibiting the coupling of light (electromagnetic energy) from coupler 10 to substrate 30. Because coupling into substrate 30 is inhibited, coupler 10 efficiently couples light from waveguide 28 to fiber 26.

In accordance with the principle of time reversal symmetry that is well known in the optics art, when a beam of light is transmitted through fiber 26 in the direction of arrow 34, diffracted light is coupled in a manner analogous to that described hereinbefore into waveguide 28 to provide an output beam of light in the direction of arrow 36. Therefore, coupler 10 bilaterally couples light between fiber 26 and waveguide 28.

In one alternative embodiment, an optical coupler may include one or more phase diffraction gratings in addition to gratings 12 and 14. In another alternative embodiment, an optical coupler may include either a plurality of absorption gratings or relief gratings instead of gratings 12 and 14. In still another embodiment, an optical coupler may include any combination of gratings referred to hereinbefore instead of gratings 12 and 14.

Although light in fiber 26 and waveguide 28 are shown to be transmitted colinearly, in an alternative embodiment, light in fiber 26 and waveguide 28 may not be colinear.

What is claimed is:

1. An optical coupler that couples electromagnetic energy between a guiding layer carried by a substrate and a medium, said guiding layer and said medium being adapted to alternatively receive an input beam of electromagnetic energy, comprising:

a first diffraction grating; and a second diffraction grating having a surface contiguously connected to a surface of said first grating, said gratings being disposed intermediate said guiding layer and said medium, said first grating causing a diffraction of evanescent waves that emanate therefrom in response to said input beam to provide diffracted electromagnetic energy that is coupled between said guiding layer and said medium, said first grating having a diffraction strength that causes a coupling to said substrate of a first component of an electromagnetic field having a given amplitude and a given phase, said second grating causing a diffraction of evanescent waves of electromagentic energy to provide diffracted electromagnetic energy that is coupled between said guiding layer and said medium, said second grating having a diffraction strength that causes a coupling to said substrate of a second component of said field having an amplitude substantially equal to said given amplitude and a phase substantially opposite from said given phase whereby said field is suppressed.

2. The coupler of claim 1 wherein said gratings are phase gratings.

3. The coupler of claim 1 wherein said gratings are absorption gratings.

* * * * *